United States Patent
Salamon et al.

(10) Patent No.: US 11,262,318 B2
(45) Date of Patent: Mar. 1, 2022

(54) ADAPTION FOR A TURNTABLE OF A CT SYSTEM

(71) Applicant: Fraunhofer-Gesellschaft zur Foerderung der angewandten Forschung e.V., Munich (DE)

(72) Inventors: Michael Salamon, Erlangen (DE); Florian Gabsteiger, Erlangen (DE); Carina Kreutner, Erlangen (DE); Johannes Leisner, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 126 days.

(21) Appl. No.: 16/393,853

(22) Filed: Apr. 24, 2019

(65) Prior Publication Data
US 2019/0250111 A1    Aug. 15, 2019

Related U.S. Application Data (63) Continuation of application No. PCT/EP2016/076206, filed on Oct. 31, 2016.

(51) Int. Cl.
*G01N 23/046* (2018.01)

(52) U.S. Cl.
CPC ... *G01N 23/046* (2013.01); *G01N 2223/3306* (2013.01); *G01N 2223/419* (2013.01)

(58) Field of Classification Search
CPC .......... G01N 23/046; G01N 2223/3306; G01N 2223/419
See application file for complete search history.

(56) References Cited

U.S. PATENT DOCUMENTS

| 4,989,225 A | 1/1991 | Gupta et al. |
| 5,228,071 A | 7/1993 | Kamata et al. |
| 2008/0217559 A1 | 9/2008 | Poglitsch et al. |

(Continued)

FOREIGN PATENT DOCUMENTS

| DE | 102015222480 A1 | 5/2017 |
| EP | 1672357 A2 | 6/2006 |

(Continued)

OTHER PUBLICATIONS

Nordtvedt, Kenneth L. , Faller, James E. and Cook, Alan H. "gravity". Encyclopedia Britannica, Nov. 12, 2020, https://www.britannica.com/science/gravity-physics. Accessed Jun. 5, 2021. (Year: 2020).*

(Continued)

*Primary Examiner* — David P Porta
*Assistant Examiner* — Fani Boosalis
(74) *Attorney, Agent, or Firm* — Perkins Coie LLP; Michael A. Glenn (57) ABSTRACT

An adaptor for a turntable of a CT system includes at least two object turntables for at least two objects and a rotation transmission element configured to be coupled to the turntable of the CT system. The two object turntables are coupled to each other using a coupler such that the at least two object turntables rotate simultaneously. The rotation transmission element is coupled to the coupler and configured to transmit a rotation from the turntable of the CT system to the coupler in order to drive the at least two object turntables.

17 Claims, 6 Drawing Sheets

(56) References Cited

U.S. PATENT DOCUMENTS

| | | | | |
|---|---|---|---|---|
| 2009/0257552 A1* | 10/2009 | Warner | ............... | G01N 23/046 |
| | | | | 378/19 |
| 2010/0181480 A1* | 7/2010 | Shimakura | ............ | H01J 37/026 |
| | | | | 250/310 |
| 2014/0352493 A1* | 12/2014 | Chung | ................. | F16H 37/065 |
| | | | | 74/813 R |
| 2016/0370284 A1* | 12/2016 | Carter | .................. | G01J 3/0291 |

FOREIGN PATENT DOCUMENTS

| | | |
|---|---|---|
| EP | 2108945 A1 | 10/2009 |
| JP | S61155845 A | 7/1986 |
| JP | S61240145 A | 10/1986 |
| WO | 2017081263 A1 | 5/2017 |

OTHER PUBLICATIONS

Britannica, The Editors of Encyclopaedia. "Centrifugal force". Encyclopedia Britannica, Feb. 13, 2018, https://www.britannica.com/science/centrifugal-force. Accessed Jun. 5, 2021. (Year: 2018).*

Pavel Trtik et al.: "Rotation axis demultiplexer enabling simultaneous computed tomography of multiple samples", MethodsX, vol. 3, Jan. 1, 2016, pp. 320-325, XP055595417, NL, DOI: 10.1016/j.mex.2016.04.005, Jan. 2016.

* cited by examiner

ADAPTION FOR A TURNTABLE OF A CT SYSTEM

CROSS-REFERENCE TO RELATED APPLICATION

This application is a continuation of copending International Application No. PCT/EP2016/076206, filed Oct. 31, 2016, which is incorporated herein by reference in its entirety.

BACKGROUND OF THE INVENTION

Embodiments of the present invention refer to an adaptor for a turntable of a CT system, a CT system comprising an adaptor. Embodiments refer to a mechanically coupled multi-turntable device for throughput optimization of commercially available industry CT systems with minimum hardware and software interaction. Further embodiments refer to a method, a computer program and an apparatus for reconstructing a CT model.

The throughput of a Computed Tomography device is mainly pre-defined by the scan time needed for the scan of the object corresponding to a certain quality. A possible way to increase the throughput is to place several objects on the turntable of the CT device. For strong absorbing objects or objects with high demands on contrast resolution this kind of simultaneous acquisition is not feasible due to exceeding penetration capabilities of the X-ray device.

For this kind of object a possible way is described in document DE 102015222480. This approach enables to increase the throughput by arranging objects on separate turntables rotating each around its own center inside the X-ray beam.

This procedure is applicable on tomographic devices with an integrated Multi-Turntable system which has to be installed by the vendor of the CT device. Due to the complexity of the tomography process mechanical, electrical and software adaptions are needed, resulting in large efforts.

SUMMARY

According to an embodiment, an adaptor for a turntable of a CT system may have: at least two object turntables for at least two objects, the at least two object turntables are coupled to each other by a coupler such that the at least two object turntables rotate simultaneously; a rotation transmission element configured to be coupled to a turntable of the CT system, coupled to the coupler and configured to transmit a rotation from the turntable of the CT system to the coupler in order to drive the at least two object turntables.

According to another embodiment, a system may have an inventive adaptor and a CT apparatus having an X-ray source, an X-ray detector and the turntable.

According to another embodiment, a method for reconstructing a CT model may have the steps of: receiving a plurality of X-ray images from a CT system and receiving rotation information from a sensor of an inventive adaptor; and image processing the plurality of X-ray images taking the rotation information into account in order to output the CT model of at least two objects.

Another embodiment may have a non-transitory digital storage medium having a computer program stored thereon to perform the method for reconstructing a CT model having the steps of: receiving a plurality of X-ray images from a CT system and receiving rotation information from a sensor of an inventive adaptor; and image processing the plurality of X-ray images taking the rotation information into account in order to output the CT model of at least two objects, when said computer program is run by a computer.

According to another embodiment, an apparatus for reconstructing a CT model may have: an interface for receiving a plurality of X-ray images; an interface for receiving rotation information from an inventive rotation sensor; and a processor for performing the image processing based on the plurality of X-ray images and the rotation information in order to output the CT model of at least two objects.

An embodiment of the present invention provides an adaptor for a turntable of a CT system. The adaptor comprises at least two object turntables for at least two objects at a rotation transmission element configured to transmit a rotation from the turntable of the CT system to the at least two object turntables. The at least two object turntables are coupled to each other by a so-called coupler such that the at least two turntables rotate simultaneously, e.g., arounds its own center. The rotation is induced by the rotation transmission element which is configured to be coupled to the turntable of the CT system and is coupled to the coupler in order to drive the object turntables when the turntable of the CT system rotates.

Embodiments of the present invention are based on the principle that the mechanical drive, arrangement and alignment of the adaptor, also referred to as multi-turntable device, can be achieved by an adaptor which is adaptable into every standard CT device. This is achieved using an adaptor configured to convert the rotation of the turntable of the CT system into a rotation of at least two turntables belonging to the adaptor and used for rotating at least two objects. By using the adaptor, the throughput of each CT device, e.g., a CT device having a standard object holder, can be increased.

According to an embodiment, the at least two turntables are mechanically coupled to each other using a belt or a plurality of gear wheels (or other gear elements) forming the coupler. According to a further embodiment the rotation transmission element is formed by a rod. This rod can extend in parallel to the rotation axis of the turntable and in parallel to the rotation axis of the at least two object turntables. For example, the rod may be in line with the rotation axis of the turntable of a CT system. The rod can transmit the rotation to the belt or to the gear wheels. Alternatively, the rod can forward the rotation directly to a first of the two object turntables, while the at least one other turntable is coupled to the driven first object turntable using a belt or gear wheels.

According to an embodiment, all object turntables may be connected to each other by a common housing which supports same. According to an embodiment the housing is fixed such that same does not rotate. The fixing can be done using a fixture, e.g., against a static part of the CT system or using electrical means. The electrical means may comprise a sensor for detecting the rotation of the transmission element, an electrical drive for performing a counter-rotation against the rotation of the rod. This counter-rotation is controlled using a controller. Due to the drive rotating in an opposite direction of the rod, the common platform remains stable. The drive may be arranged between the transmission element and the rod or between the turntable of the CT and the rod.

According to another embodiment, the adaptor may comprise a sensor for detecting a misalignment of the adaptor and the turntable of the CT or of the objects to be turned using the object turntables. According to an embodiment, the transmission element or an embodiment having the rod, the rod may be arranged within the center of the turntable of the CT system. In order to achieve this, the means for coupling the transmission element to the turntable of the CT system, i.e., for example the standard object holder, may be connected to a rod using an eccentric element. Using this eccentric element the adaptor may be centered during the installation of the adaptor to the turntable of the CT system.

Another embodiment provides a system comprising a CT device and the above discussed adaptor. The system may comprise a laser supporting the alignment of the adaptor with respect to the turntable of a CT system.

Another embodiment provides a method for reconstructing a CT model based on a plurality of received X-ray images of at least two objects rotated in parallel (i.e., next to each other) and a rotation information. The method comprises the step of reconstructing the CT model or the CT models of the at least two objects. This method can be performed using a computer program. The embodiment provides an apparatus having an interface for receiving the image data and for receiving the rotation information. The apparatus further comprises a processor for processing the CT model.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention will be discussed in detail below referring to the enclosed figures. Identical reference numbers are provided to objects or structures having identical or similar functions and the description thereof is mutually applicable or interchangeable.

Figure 1A:
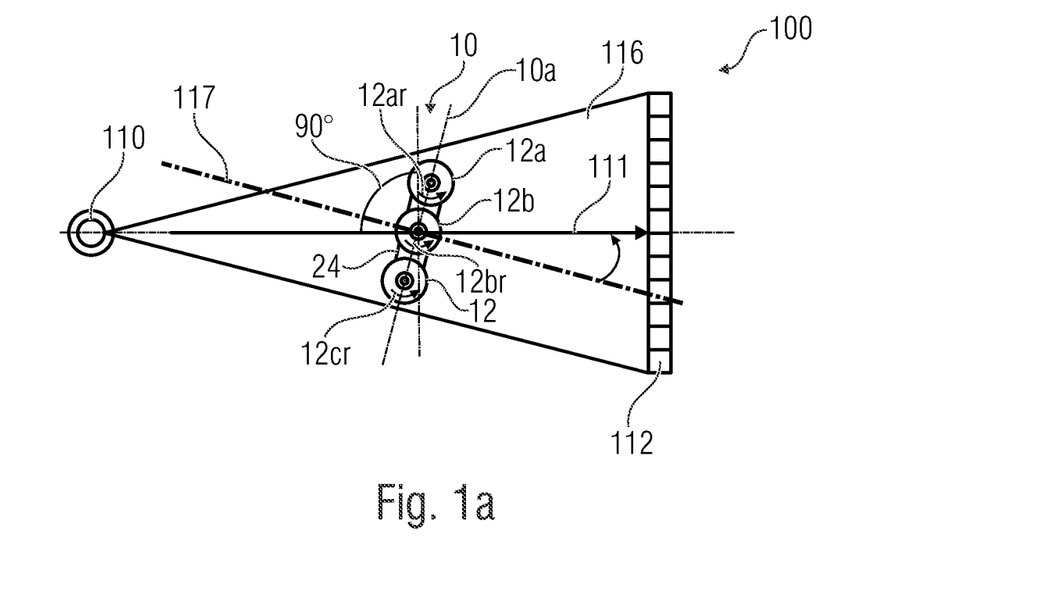
FIG. 1a shows a schematic block diagram of an adaptor for a turntable of a CT system enabling to form a multi-turntable device in a top view according to an embodiment.
Figure 1B:
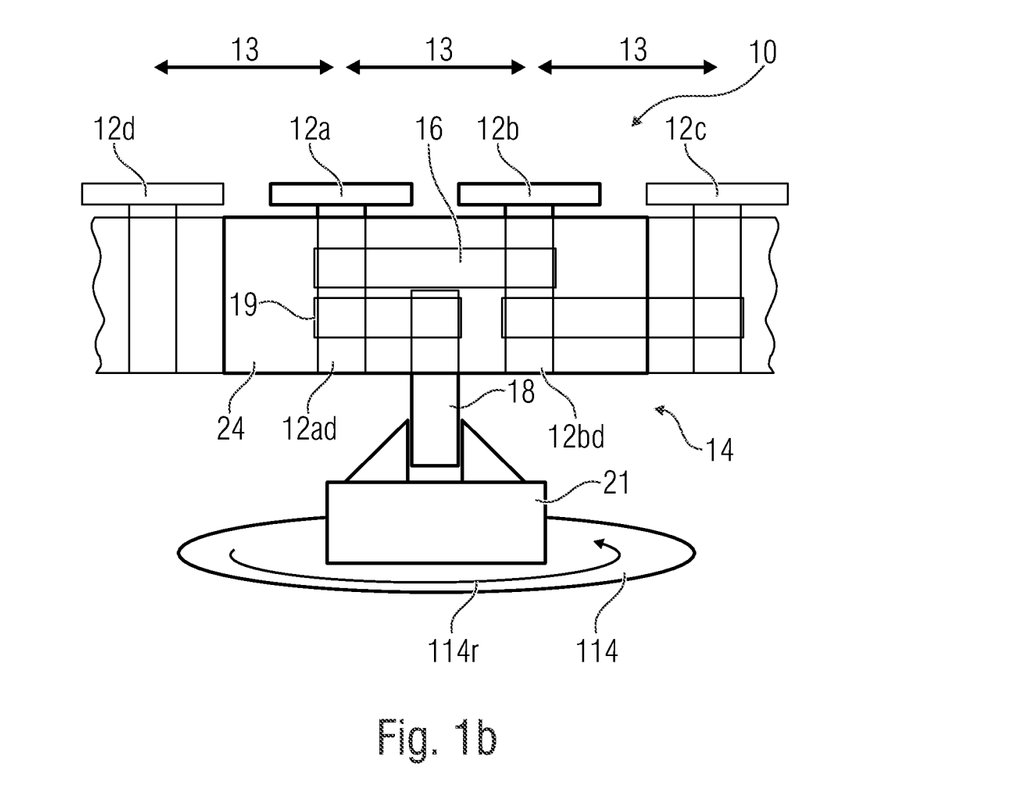
FIG. 1b shows a schematic block diagram of the adaptor of FIG. 1a and a side view.

FIGS. 1a and 1b show an adaptor 10 to be used in combination with a CT system 100 which comprises an X-ray source 110, an X-ray detector 112 arranged opposite to the X-ray source 110 and a turntable 114 of the CT system 100 which is arranged between the X-ray source 110 and the X-ray detector 112, i.e., within the X-ray cone/beam path 116 (defined by the emission angle of the X-ray source 110 and the width of the detector 112). Here, the beam path 116 (Conebeam or Fanbeam) may have an aperture angle in the range between 5° to 30° (in general >5°).

FIG. 1a shows a top view of the system 100 in combination with the adaptor 10, wherein FIG. 1b shows a side view of the adaptor 110 inside the X-ray cabin (inside the X-ray cone 116).

The adaptor 10 comprises in the basic version at least two object turntables 12a and 12b which are arranged side-by-side spaced by a distance 13 in parallel to the turntable 114. The two object turntables 12a and 12b, which may be arranged within the same height level, are spaced from the level of the turntable 114. The spacing is due to the mechanism 14 enabling to transmit the rotation of the turntable 114 to the turntables 12a and 12b (cf. "12ar and 12br").

The mechanism 14 comprises a coupler 16 enabling to mechanically couple the two object turntables 12a and 12b such that same rotate in the same manner. In the same manner can mean that the two object turntables 12a and 12b rotate within the same direction and/or have the same rotational speed. The coupler may be implemented as belt or toothed belt which entwines around drive shafts 12ad and 12bd belonging to the respective object turntables 12a and 12b (being formed as elongation of the turntable 12a and 12b).

The mechanism 14 additionally comprises a rotation transmission element 18, e.g., a rod. The transmission element 18 is mechanically coupled to the coupler 16, via another belt 19 and the shaft 12ad, such that the coupler and, consequently, the two object platforms 12a and 12b can be driven by rotation of the rod 18. Vice versa, the rotational transmission element 18 is coupled to the turntable 114 of the CT system 100 such that the transmission element can be driven by the turntable 114. In this embodiment the coupling between the elements 18 and 114 is done using an object holder 21, e.g., a standard object holder into which the rod 18 is fixed.

According to an embodiment, the adaptor 10 may comprise a common housing 24 connecting the turntables 12a and 12b as well as the rod 18 and the coupler 16. The common housing 24 is formed as a common platform or common bearing/mounting bracket supporting the drive shafts 12ad and 12bd and the rod 18, wherein the belt 16 and the belt 19 are arranged within the housing 24. Since the structure of the adaptor 10 has been discussed above, the functionality of same will be discussed below.

A rotation of the turntable 114 is transmitted via the optional object holder 21 to the rod 18. The rotation of the rod 18 causes the rotation of the drive shafts 12ad and 12bd due to the coupling using the belt 19 and the coupler/belt 16. All diameters of the rod 18 and the drive shafts 12ad and 12bd may be the same such that a 1:1 transmission may be realized. In other words, this means that the adaptor 10 allows a transfer of the rotation of the CT device turntable 114 to the turntables 12a and 12b of the multi-turntable device 10.

Adaptor 10 may comprise more than the discussed two object turntables, namely three object turntables 12a, 12b and 12c, each rotating simultaneously (cf. 12ra, 12br and 12cr or even more turntables 12d, etc.). According to an embodiment the three or more turntables 12a, 12b, 12c and/or 12d may be arranged at variable or fixed distances 13 along a curved or a straight line.

With respect to the above embodiment, although the gear (cf. 16, 18, 19, 12ad and 12bd) has been discussed in context of some drive shafts and a drive shaft in combination with a (tooth) belt 16 and 19, it should be noted that the gear may also be realized as another rotary transmission concept, e.g., using gears (gear wheels). According to the transmission has a ratio of 1:1. However, another or a variable ratio may also be possible.

Please note that the adaptor 10 (multi-turntable device) should be or remain in the center of the rotation stage (during the complete CT measurement). Therefore, according to an embodiment, a laser 117 may be used for the positioning procedure. This enables that the manual adjustment can be supported by the laser-line 117 or the spot beam emitted perpendicular to the line of the turntables from the center of the multi-turntable device 10. By rotating of the device 10 the laser mark 117 is positioned on the center of the detector and on the center of the X-ray source as shown. In other words, the laser 117 is aligned such that it crosses the vector of the X-ray source point and the detector center (cf. 111) at the position at which the adaptor 10 should be centered.

As illustrated by the hatched line marked with the reference numeral 10o, the adaptor 10 can be tilted against the line 111. This should be avoided using the laser point to ensure that the line 10o is perpendicular to the line 111 during the scan operation. The adaptor 10 should remain in this position during the CT measurement while the rotation of the CT device turntable 114 is transferred to the turntables 12a and 12b of the device 10. The fixture of the device 10 can be carried out in different ways as will be discussed with respect to FIGS. 2a to 2c.

Figure 2A:
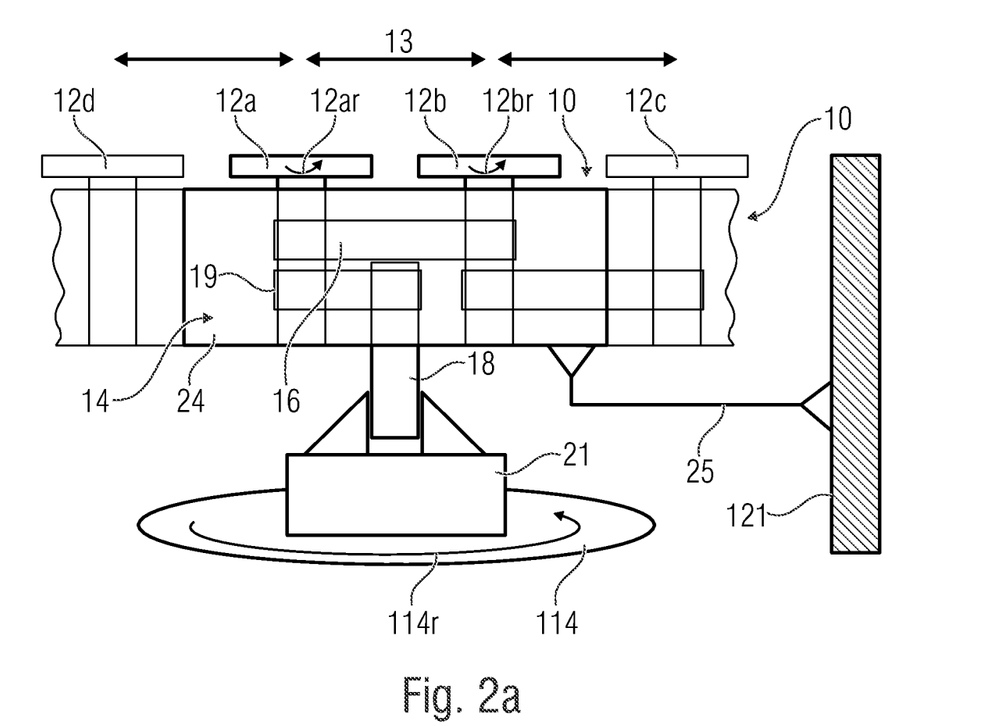
FIGS. 2a-2e show different concepts for stabilizing an adaptor comparable to the adaptor of FIGS. 1a and 1b.

FIG. 2a shows the arrangement of the CT system 100 in combination with the adaptor 10. The adaptor 10 is fixed inside the X-ray cabinet (cf. wall 100) using a mechanical framework fixture 25. The fixture 25 connects the housing 24 with the wall 121. Due to the connection just the rod 18, the mechanics 14 and the object turntable 12a and 12b rotate (cf. 12ar and 12br) when the turntable 114 is in rotation (cf. 114r) while the housing 12 and the device 10 remains stable during the CT measurement.

Figure 2B:
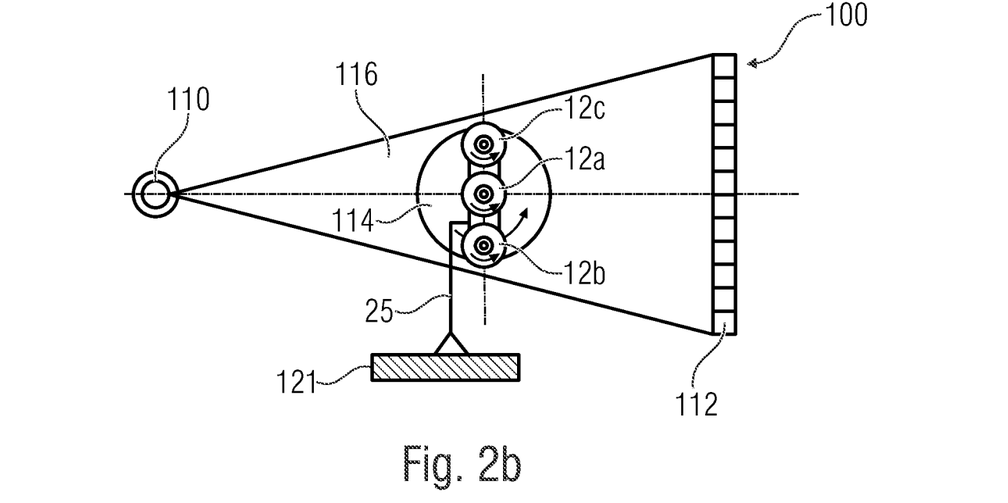

FIG. 2b shows the corresponding top view of the embodiment of FIG. 2a (in a side view). As can be seen, even the adaptor 10 having the fixture 25 for fixing the adaptor 10 against the wall 121 can be used in combination with a standard CT system 100.

A further realization possibility is based on an integrated position sensor and corresponding drive allowing omitting the mechanical complex framework fixture. This approach will be discussed with respect to FIGS. 2c, 2d and 2e.

Figure 2C:
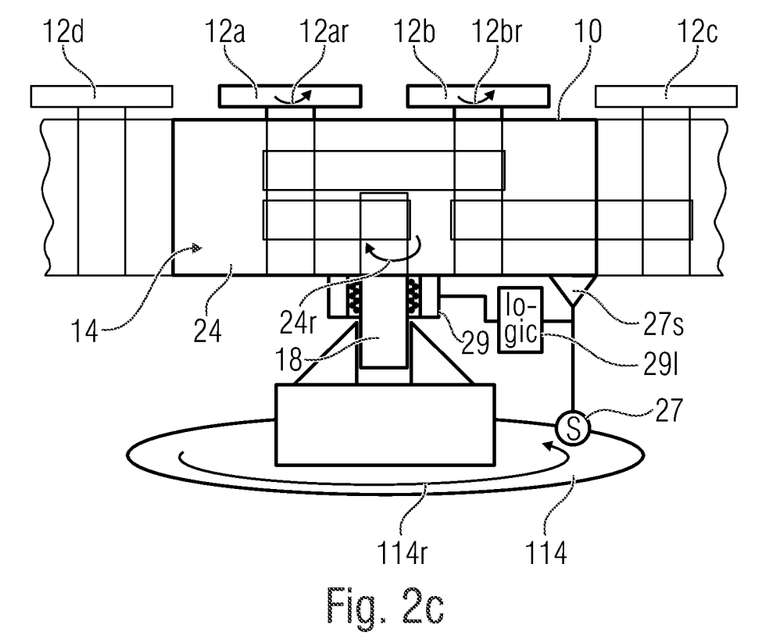

FIG. 2c shows the adaptor 10 having the housing 24, the mechanism 14 for forwarding the rotation 114r of the turntable 114 to the turntables 12a and 12b (cf. 12ar and 12br).

The stabilization of the housing 24 and the device is realized using an integrated closed loop positioning based on a rotary encoder/rotary sensor 27 and a corresponding drive 29. The sensor 27 is attached to the CT turntable 114 and configured to measure the relative rotary speed between the housing 24 (cf. fixture of the sensor 27s) and the CT turntable 114. The sensor 27 as well as the drive 29 is fixed using the fixture 27 to the housing 24. The drive 29 is realized as hollow shaft drive which is directly integrated onto the coupling rod 18. Thus, the drive enables to rotate the rod 18 against the housing 24. The rotation is performed such that the housing 24 counter-rotates (cf. 24r) against the rotation of the turntable 114 (cf. 114r). In further detail, the rotation 24r is controlled such that just a relative rotation to the turntable 114 is caused and no rotation when compared to the CT system. Note that the rotation 24r is controlled using the logic 291 (controller) of the drive 29 which gets the sensor signal of the sensor 27 as control variable.

Figure 2D:
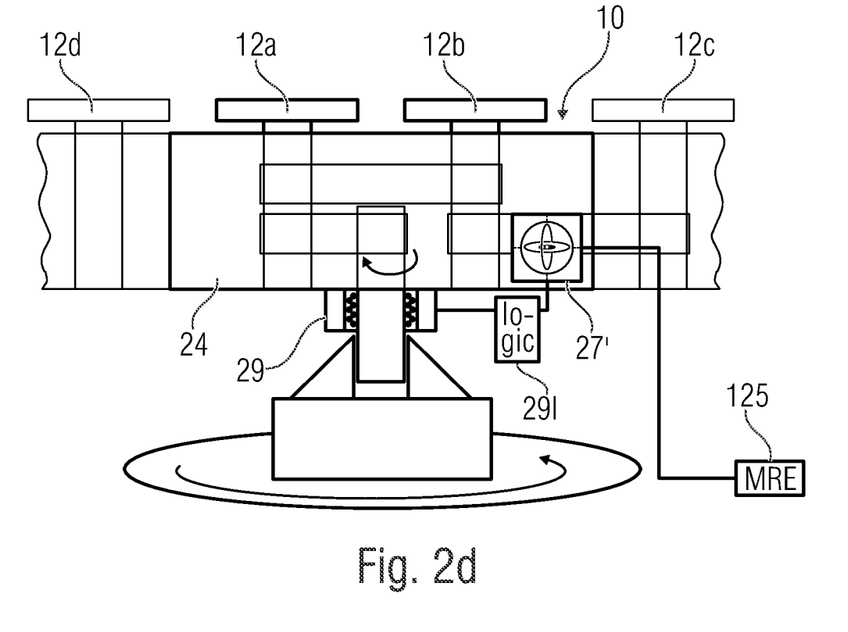

FIG. 2d shows another implementation of an integrated close loop positioning based on an electromagnetic field sensor 27' instead of the rotation sensor 27. The field sensor 27' is integrated into the housing 24 of the adaptor 10. Furthermore, the field sensor 27' is connected to the drive 29 via the logic 291.

Figure 2E:
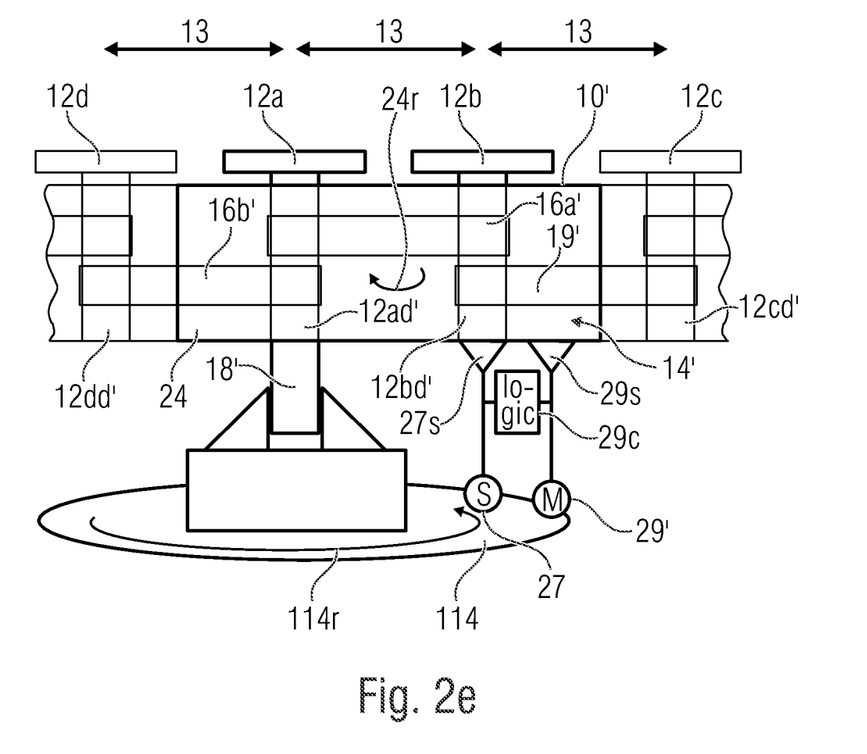

FIG. 2e shows another option for fixing the adaptor 10 against rotating within the X-ray beam (cf. FIG. 1a 116). The adaptor 10', or especially the housing 24, is fixed using the sensor 27 and a drive 29'. Another difference is that the adaptor 10', or especially the mechanism 14', is realized with a rod 18' which is formed by an elongated drive shaft 12ad' for the turntable 12a.

Regarding the integrated close loop positioning mechanism: The sensor 27 as well as the controller 291 is substantially equal to the entities as discussed with respect to the embodiment of FIG. 2b. However, the drive 29' is connected to the housing 24 via the connector 29s and acts on the turntable 114. The controlling is performed such that the housing performs a rotation 24r contrary to the rotation 114r.

The mechanism 14' is based on an elongated rod 18' which forms the drive shaft 12ad' for the turntable 12a. The other turntables 12b and the optional turntables 12c and 12d are driven using the belt 16a' as coupler and 16b' and 19'. The belt 16b' is arranged between the drive shaft 12ad' and the drive shaft 12dd' of the turntable 12d, while the belt 19' is arranged between the drive shaft 12bd' belonging to the turntable 12b and the drive shaft 12cd' belonging to the turntable 12c.

In other words, the difference between the mechanism 14' and the mechanism 14 is that the mechanism 14' can be used for an adaptor having a turntable in the center of the adaptor while the mechanism 14 is used for an adaptor having an even number of turntables when a none object turntable is arranged with the center.

According to an embodiment, the electromagnetic field sensor 27' or, in general, each sensor of the adaptor 10 may be implemented to output its sensor signal to the computational device for reconstructing the acquired data 25, such that the reconstruction engine 125 receives additional information, e.g. regarding the eccentricity, tilt or slant. In general, the sensor 27 or 27' can—according to first embodiments—be applied to stabilize the device 10 on the turntable 114 and—according to further embodiments—to measure misalignment data used for artifacts compensation upfront and during the CT measurement in order to enhance the image quality for the reconstruction. Artifacts compensation based on externally gained data makes especially sense in case of the usage of so called Feldkamp-Algorithm which is typically used for CT-systems having a defined Cone- or Fan-Beam, which may have an aperture angle $>5°$ (or $2°$). Background thereof is that the 3D reconstruction of data gained by means of a CT system, which mainly uses a beam having nearly parallel beam, does not require additional information. In case of a Cone- or Fan-Beam with a significant beam angle already the cone distortion for each turntable of the adaptor have to be considered as other additional misalignments.

Within the above embodiments the sensor 27 or 27' has been discussed in context of a rotational sensor or electric field measurement device. However, the sensor can be a mechanically coupled rotational encoder providing angular position or a complex rotational measuring sensor or an electric field measuring device. The sensors can be used for controlling the adaptor 10 using a drive or for providing additional information, e.g., the angular position or, eccentricity or the tilt and the slant angles of the adaptor 10 during the measurement. This additionally gained information can be used to support the computational processing in reconstruction of the acquired data such that artifacts resulting from static and temporal misalignments during processing can be reduced.

Figure 3:
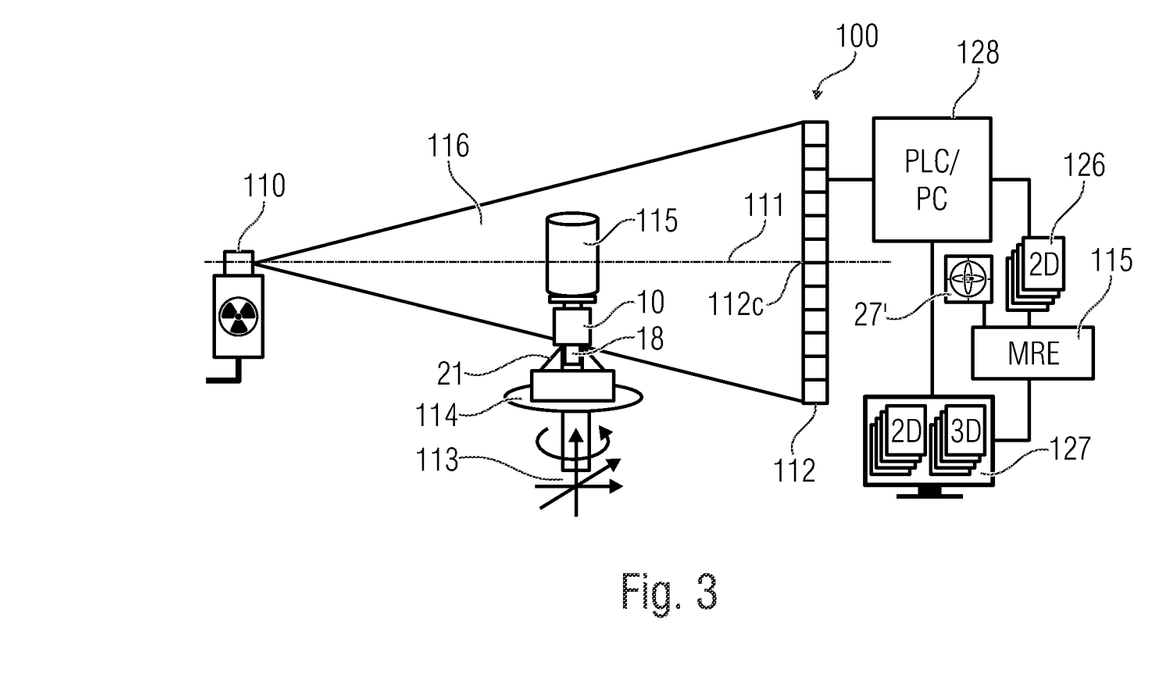
FIG. 3 shows a schematic block diagram illustrating the application of the adaptor according to a CT system according to an enhanced embodiment.

With respect to FIG. 3 an application of the adaptor 10 into a standard CT system 100 will be discussed.

The adaptor 10 is clamped onto the object holder 21 via the rod 18, wherein the object holder 21 is positioned onto the turntable 114 of the system 100. The adaptor 10 is aligned perpendicular with the line of the turntable 114 to the horizontal plane defined by the X-ray source point 110 and the detector center 112c. The height of the object or the plurality of objects 115 is selected such that same are arranged within the X-ray cone 116 and with the center line 111 between the source 110 and the detector center 112c. According to embodiments this positioning may be performed using the manipulation system 113 of the system 100. This manipulation system may have, for example, three axes.

Typically, the system 100 comprises a computational entity 125 receiving the plurality of acquired 2D images 126 from the detector 112. The reconstruction process performed by the entity 125 may also be based on a sensor data, e.g., from the sensor 27'. The result of the reconstruction can be visualized using the visualization unit 127 and/or stored onto a storing device (not shown). Additionally, the CT system 100 comprises a controller 128 for controlling the CT system entities 110, 123 and 114. Typically the controller 128 is also connected to the detector 112 in order to receive the sensor data for procedures like the calibration procedure.

An embodiment of the present invention refers to the computational device 125 performing the reconstruction based on the acquired image data 126 and sensor data, e.g., from the sensor 27 and/or 27'. Another embodiment refers to a corresponding method for reconstructing a CT model. Please note that typically a plurality of CT models for the plurality of objects 115 is reconstructed.

As discussed above the rotation of the plurality of objects as well as the X-Ray process are performed simultaneously. Since each rotation plate and each object remain on its position and rotate around each own rotation center, the data used for the reconstruction can easily be separated in two or more data sets belonging to the two or more objects. Background thereof is that the entire X-Ray cone can be separated into single "sub-cones" (one per object), wherein each sub-cone is distort or absorbed by the respective object. Thus, according to embodiments the CT-models of the at least two models are calculated based on independent/separated image sets, i.e. such that the reconstruction of the two or more objects can be performed separately.

As discussed, the usage of the sensor data is optional. The advantage of the above discussed adaptor 10 is that, based on the mechanical coupling of the multi-turntable device 10 to the rotation of the CT turntable 114 performed during a conventional CT scan, no additional mechanical or electrical integration efforts are required and the CT process can be run as usual. The installation of the multi-turntable device 10 is similar to the installation of an object to be scanned except a slight alignment routine. The scan is performed with the scan parameters supplied by the CT device. After the acquisition of the data the reconstruction process is done on the acquired image data.

Figure 4A:
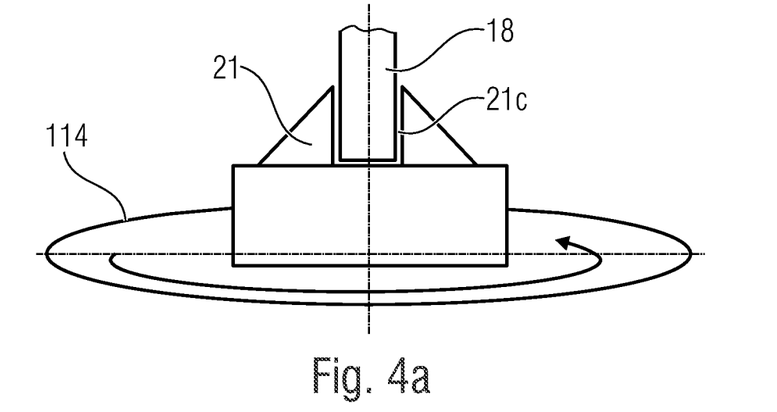
FIGS. 4a-4c show schematic block diagrams of an object holder to be used in combination with the turntable of the CT system and the above discussed adaptor according to an embodiment.
Figure 4B:
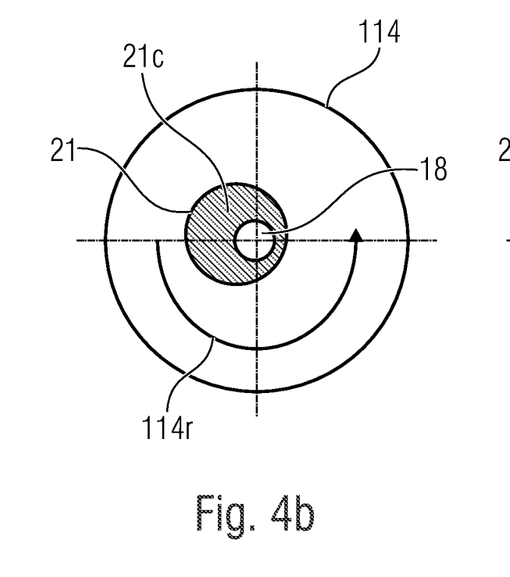

As discussed above, the multi-turntable device 10 should be centered with respect to the rotation stage 114. This can be achieved by a pre-aligning of the sample holder 21. As illustrated by FIG. 4a, the sample holder 21 is positioned on the turntable 114 and holds the rod 18. Since the positioning of the holder 21 on the turntable 114 is often difficult, the holder 21 may be designed such that same has an eccentrically rotatable clamp 21c as illustrated by FIG. 4b.

Figure 4C:
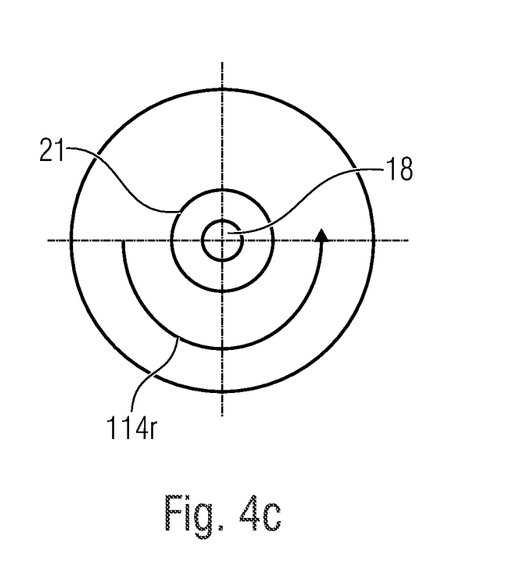

Due to the eccentricity, the rod 18 may be positioned precisely to the center of the turntable 114, i.e., at the rotation center of the rotation 114r, as illustrated by FIG. 4c.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-ray Disc®, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An adaptor for a turntable of a CT system, comprising:
at least two object turntables for at least two objects, the at least two object turntables are coupled to each other by a coupler such that the at least two object turntables rotate simultaneously;
a rotation transmission element configured to be coupled to a turntable of the CT system, coupled to the coupler and configured to transmit a rotation from the turntable of the CT system to the coupler in order to drive the at least two object turntables; and
wherein the adaptor further comprises a common housing for the at least two object turntables, wherein the common housing is configured to support the at least two object turntables, and wherein the common housing is fixed by means of a rotation sensor, controller and a drive between the transmission element and the common housing or between the turntable and the common housing and/or wherein the common housing is configured to remain stable if the coupler and the at least two object turntables perform a rotation, and wherein the sensor is configured to detect a rotation of the coupler, wherein the drive is configured to rotate the common housing against the transmission element or against the turntable and wherein the controller is configured to control the drive such that the rotation of the coupler and the rotation caused by the drive balance out each other; or
wherein the rotation transmission element comprises a shape enabling coupling to a standard object holder of the turntable of the CT system, and wherein the transmission element comprises an eccentric adaptor arranged between the standard object holder and the transmission element.

2. The adaptor according to claim 1, wherein the at least two object turntables are coupled to each other by a belt.

3. The adaptor according to claim 1, wherein the at least two object turntables are coupled to each other via gear wheels.

4. The adaptor according to claim 1, wherein the transmission element comprises a rod to be arranged in parallel to the rotation axis of the turntable of the CT system.

5. The adaptor according to claim 4, wherein the rod is arranged in the center of the turntable of the CT system.

6. The apparatus according to claim 1, wherein the common housing is fixed using a mechanical fixture and/or configured to remain in a stable position when the coupler and the at least two objects perform a rotation.

7. The adaptor according to claim 1, wherein the adaptor comprises a rotation sensor configured to detect a rotation between the common housing and the transmission element or between the common housing and the turntable.

8. The adaptor according to claim 1, wherein the adapter comprises at least three object turntables which are arranged on a curved line or on a straight line.

9. The adaptor according to claim 1, wherein the adaptor comprises a misalignment sensor and/or a misalignment unit.

10. The adaptor according to claim 1, wherein the adaptor comprises a sensor for detecting an electrical field.

11. The adaptor according to claim 1, wherein the coupler is arranged on a first side of the adaptor and wherein the at least two object turntables are arranged on a second side, opposite to the first side.

12. A system comprising an adaptor according to claim 1 and a CT apparatus comprising an X-ray source, an X-ray detector and the turntable.

13. A system comprising an adaptor and a CT apparatus comprising an X-ray source, an X-ray detector and the turntable; wherein the system further comprises a laser enabling the alignment of the adaptor with respect to the turntable and/or with respect to the center of the X-ray source; wherein the adaptor for a turntable of a CT system, comprising: at least two object turntables for at least two objects, the at least two object turntables are coupled to each other by a coupler such that the at least two object turntables rotate simultaneously; and a rotation transmission element configured to be coupled to a turntable of the CT system, coupled to the coupler and configured to transmit a rotation from the turntable of the CT system to the coupler in order to drive the at least two object turntables.

14. The system according to claim 12, wherein the X-ray source and the X-ray detector define a X-Ray beam path comprising an aperture angle larger than 5°.

15. A method for reconstructing a CT model, the method comprising:
receiving a plurality of X-ray images from a CT system and receiving rotation information from a sensor of an adaptor for a turntable of a CT system; and
image processing the plurality of X-ray images taking the rotation information into account in order to output the CT model of at least two objects;
wherein the adaptor comprises at least two object turntables for at least two objects, the at least two object turntables are coupled to each other by a coupler such that the at least two object turntables rotate simultaneously; a rotation transmission element configured to be coupled to a turntable of the CT system, coupled to the coupler and configured to transmit a rotation from the turntable of the CT system to the coupler in order to drive the at least two object turntables; and
wherein the adaptor further comprises a common housing for the at least two object turntables, wherein the common housing is configured to support the at least two object turntables, and wherein the common housing is fixed by means of a rotation sensor, controller and a drive between the transmission element and the common housing or between the turntable and the common housing and/or wherein the common housing is configured to remain stable if the coupler and the at least two object turntables perform a rotation, and wherein the sensor is configured to detect a rotation of the coupler, wherein the drive is configured to rotate the common housing against the transmission element or against the turntable and wherein the controller is configured to control the drive such that the rotation of the coupler and the rotation caused by the drive balance out each other; or wherein the rotation transmission element comprises a shape enabling coupling to a standard object holder of the turntable of the CT system, and wherein the transmission element comprises an eccentric adaptor arranged between the standard object holder and the transmission element.

16. A non-transitory digital storage medium having a computer program stored thereon to perform a method for reconstructing a CT model, the method comprising:
receiving a plurality of X-ray images from a CT system and receiving rotation information from a sensor of an adaptor for a turntable system; and
image processing the plurality of X-ray images taking the rotation information into account in order to output the CT model of at least two objects,
when said computer program is run by a computer;
wherein the adaptor comprises at least two object turntables for at least two objects, the at least two object turntables are coupled to each other by a coupler such that the at least two object turntables rotate simultaneously; a rotation transmission element configured to be coupled to a turntable of the CT system, coupled to the coupler and configured to transmit a rotation from the turntable of the CT system to the coupler in order to drive the at least two object turntables; and
wherein the adaptor further comprises a common housing for the at least two object turntables, wherein the common housing is configured to support the at least two object turntables, and wherein the common housing is fixed by means of a rotation sensor, controller and a drive between the transmission element and the common housing or between the turntable and the common housing and/or wherein the common housing is configured to remain stable if the coupler and the at least two object turntables perform a rotation, and wherein the sensor is configured to detect a rotation of the coupler, wherein the drive is configured to rotate the common housing against the transmission element or against the turntable and wherein the controller is configured to control the drive such that the rotation of the coupler and the rotation caused by the drive balance out each other; or wherein the rotation transmission element comprises a shape enabling coupling to a standard object holder of the turntable of the CT system, and wherein the transmission element comprises an eccentric adaptor arranged between the standard object holder and the transmission element.

17. An apparatus for reconstructing a CT model, comprising:
an interface adapted for receiving a plurality of X-ray images;
an interface adapted for receiving rotation information from a rotation sensor of an adapter of a turntable system; and
a processor adapted for performing the image processing based on the plurality of X-ray images and the rotation information in order to output the CT model of at least two objects;
wherein the adaptor comprises at least two object turntables for at least two objects, the at least two object turntables are coupled to each other by a coupler such that the at least two object turntables rotate simultaneously; a rotation transmission element configured to be coupled to a turntable of the CT system, coupled to the coupler and configured to transmit a rotation from the turntable of the CT system to the coupler in order to drive the at least two object turntables; and wherein the adaptor further comprises a common housing for the at least two object turntables, wherein the common housing is configured to support the at least two object turntables, and wherein the common housing is fixed by means of a rotation sensor, controller and a drive between the transmission element and the common housing or between the turntable and the common housing and/or wherein the common housing is configured to remain stable if the coupler and the at least two object turntables perform a rotation, and wherein the sensor is configured to detect a rotation of the coupler, wherein the drive is configured to rotate the common housing against the transmission element or against the turntable and wherein the controller is configured to control the drive such that the rotation of the coupler and the rotation caused by the drive balance out each other; or wherein the rotation transmission element comprises a shape enabling coupling to a standard object holder of the turntable of the CT system, and wherein the transmission element comprises an eccentric adaptor arranged between the standard object holder and the transmission element.

\* \* \* \* \*